(12) United States Patent
Alkan

(10) Patent No.: US 8,141,122 B2
(45) Date of Patent: Mar. 20, 2012

(54) RF TERMINATE/PERMIT SYSTEM

(75) Inventor: Erdogan Alkan, Fayetteville, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 356 days.

(21) Appl. No.: 12/567,143

(22) Filed: Sep. 25, 2009

(65) Prior Publication Data

US 2010/0251324 A1 Sep. 30, 2010

Related U.S. Application Data

(60) Provisional application No. 61/164,829, filed on Mar. 30, 2009, provisional application No. 61/186,934, filed on Jun. 15, 2009.

(51) Int. Cl.
*H04N 7/173* (2011.01)

(52) U.S. Cl. ........ 725/127; 725/121; 725/124; 725/125; 725/126

(58) Field of Classification Search ........... 725/121–127
See application file for complete search history.

(56) References Cited

U.S. PATENT DOCUMENTS

| | | | |
|---|---|---|---|
| 3,609,727 A * | 9/1971 | Riebs | 340/870.22 |
| 3,790,909 A | 2/1974 | Le Fevre | |
| 3,924,187 A * | 12/1975 | Dormans | 725/125 |
| 4,512,033 A | 4/1985 | Schrock | |
| 4,520,508 A | 5/1985 | Reichert, Jr. | |
| 4,648,123 A | 3/1987 | Schrock | |
| 4,677,390 A | 6/1987 | Wagner | |
| 4,714,959 A * | 12/1987 | Pshtissky | 348/707 |
| 4,961,218 A | 10/1990 | Kiko | |
| 4,982,440 A | 1/1991 | Dufresne et al. | |
| 5,010,399 A | 4/1991 | Goodman et al. | |
| 5,126,840 A * | 6/1992 | Dufresne et al. | 725/125 |
| 5,214,505 A | 5/1993 | Rabowsky et al. | |
| 5,231,660 A | 7/1993 | West, Jr. | |
| 5,369,642 A | 11/1994 | Shioka et al. | |
| 5,548,255 A | 8/1996 | Spielman | |
| 5,745,836 A | 4/1998 | Williams | |
| 5,815,794 A | 9/1998 | Williams | |
| 5,839,052 A | 11/1998 | Dean et al. | |
| 5,893,024 A | 4/1999 | Sanders et al. | |
| 5,937,330 A | 8/1999 | Vince et al. | |
| 5,950,111 A | 9/1999 | Georger et al. | |
| 5,970,053 A | 10/1999 | Schick et al. | |
| 6,014,547 A | 1/2000 | Caporizzo et al. | |
| 6,049,693 A * | 4/2000 | Baran et al. | 725/124 |
| 6,069,960 A | 5/2000 | Mizukami et al. | |
| 6,094,211 A | 7/2000 | Baran et al. | |

(Continued)

FOREIGN PATENT DOCUMENTS

JP 55080989 A 6/1980

(Continued)

*Primary Examiner* — Son P Huynh
(74) *Attorney, Agent, or Firm* — Schmeiser Olsen & Watts

(57) ABSTRACT

There is provided a terminate or permit device that includes an internal circuitry, which discriminates between noise and non-noise transmissions. In one embodiment, the internal circuitry comprises a switch and termination unit ("STU") with a signal path that is used to terminate and/or permit the upstream bandwidth based on the presence of non-noise transmissions. The internal circuitry also comprises a signal processing unit ("SPU") with a processing circuit, which is configured to identify the non-noise transmissions from the upstream bandwidth, and to cause the STU to permit the upstream bandwidth based on the presence of the non-noise transmissions.

18 Claims, 7 Drawing Sheets

U.S. PATENT DOCUMENTS

| | | |
|---|---|---|
| 6,205,138 B1 | 3/2001 | Nihal et al. |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,495,998 B1 | 12/2002 | Terreault |
| 6,498,925 B1 | 12/2002 | Tauchi |
| 6,510,152 B1 | 1/2003 | Gerszberg et al. |
| 6,560,778 B1 | 5/2003 | Hasegawa |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,678,893 B1 | 1/2004 | Jung |
| 6,683,513 B2 | 1/2004 | Shamsaifar et al. |
| 6,725,462 B1 | 4/2004 | Kaplan |
| 6,728,968 B1 | 4/2004 | Abe et al. |
| 6,757,910 B1 | 6/2004 | Bianu |
| 6,804,828 B1 | 10/2004 | Shibata |
| 6,845,232 B2 | 1/2005 | Darabi |
| 6,877,166 B1 | 4/2005 | Roeck et al. |
| 6,928,175 B1 | 8/2005 | Bader et al. |
| 7,003,275 B1 | 2/2006 | Petrovic |
| 7,029,293 B2 | 4/2006 | Shapson et al. |
| 7,039,432 B2 | 5/2006 | Strater et al. |
| 7,162,731 B2 | 1/2007 | Reidhead et al. |
| 7,283,479 B2 | 10/2007 | Ljungdahl et al. |
| 7,454,252 B2 | 11/2008 | El-Sayed |
| 7,505,819 B2 | 3/2009 | El-Sayed |
| 7,530,091 B2 | 5/2009 | Vaughan |
| 2001/0016950 A1 | 8/2001 | Matsuura |
| 2002/0141347 A1 | 10/2002 | Harp et al. |
| 2002/0144292 A1 | 10/2002 | Uemura et al. |
| 2002/0166124 A1 | 11/2002 | Gurantz et al. |
| 2004/0172659 A1 | 9/2004 | Ljungdahl et al. |
| 2004/0229561 A1 | 11/2004 | Cowley et al. |
| 2005/0034168 A1 | 2/2005 | Beveridge |
| 2005/0183130 A1 | 8/2005 | Sadja et al. |
| 2005/0283815 A1 | 12/2005 | Brooks et al. |
| 2005/0289632 A1 | 12/2005 | Brooks et al. |
| 2006/0015921 A1 | 1/2006 | Vaughan |
| 2006/0205442 A1 | 9/2006 | Phillips et al. |
| 2006/0282871 A1 | 12/2006 | Yo |
| 2007/0288981 A1 | 12/2007 | Mitsuse et al. |
| 2007/0288982 A1 | 12/2007 | Donahue |
| 2008/0022344 A1 | 1/2008 | Riggsby |
| 2008/0040764 A1 | 2/2008 | Weinstein et al. |
| 2008/0127287 A1 | 5/2008 | Alkan et al. |
| 2009/0031391 A1 | 1/2009 | Urbanek |
| 2009/0047917 A1 | 2/2009 | Phillips et al. |
| 2009/0077608 A1 | 3/2009 | Romerein et al. |

FOREIGN PATENT DOCUMENTS

| | | |
|---|---|---|
| JP | 55132126 A | 10/1980 |
| JP | 57091055 A | 6/1982 |
| JP | 58101582 U | 6/1983 |
| JP | 05899913 | 7/1983 |
| JP | 61157035 A | 7/1986 |
| JP | 05191416 A | 7/1993 |
| JP | 07038580 A | 2/1995 |
| JP | 11069334 A | 3/1999 |
| JP | 2001177580 A | 6/2001 |
| JP | 2004080483 A | 3/2004 |
| JP | 2005005875 A | 1/2005 |
| JP | 2007166109 A | 6/2007 |
| JP | 2007166110 A | 6/2007 |
| WO | WO-0024124 A1 | 4/2000 |
| WO | WO-0172005 A1 | 9/2001 |
| WO | WO-0233969 A1 | 4/2002 |
| WO | WO-02091676 A1 | 11/2002 |

* cited by examiner

RF TERMINATE/PERMIT SYSTEM

CROSS-REFERENCE TO RELATED APPLICATIONS

This application claims the benefit of priority under 35 U.S.C. §119(e) from U.S. Provisional Patent Application Ser. No. 61/164,829, entitled "RF Terminate/Permit System," and filed on Mar. 30, 2009. This application also claims the benefit of priority under 35 U.S.C. §119(e) from U.S. Provisional Patent Application Ser. No. 61/186,934 entitled "RF Terminate/Permit System," and filed on Jun. 15, 2009. The content of these applications is incorporated herein by reference in their entirety.

FIELD OF THE INVENTION

The present invention relates generally to signal conditioning devices for use in a community antenna television ("CATV") system, and more particularly, to signal conditioning devices, and other signal processing systems that are configured to discriminate between noise and non-noise transmissions in an upstream bandwidth.

BACKGROUND OF THE INVENTION

CATV systems provide a premise with many services including, but not limited to, Internet service, telephone service (e.g., voice-over-Internet protocol ("VOIP") telephone), television service, and music service. Each of these services requires the CATV system and the premise to exchange bandwidth, such as, for example, radio frequency ("RF") signals, and digital signals, among many others. Typically the CATV system is configured to use bandwidths that are separated from one another for the purpose of grouping transmissions, and more often the grouping is by the direction that the transmission are transmitted or received in the CATV system. That is, transmissions that have one frequency may be transmitted or received relative to the premise and/or the head-end of the CATV system in a direction that is different from transmissions that have a second frequency. As one example, transmissions that originate from the head-end facility and are transmitted to the premise are referred to herein as a downstream bandwidth, while transmissions that originate from the premise and are transmitted to the head-end facility are referred to herein as an upstream bandwidth.

FIG. 1 illustrates one example of a CATV system 100 that includes a head-end facility 102 and a plurality of local networks 104, which are connected to the head-end facility 102 by distribution lines 106. Each local network 104 includes a feed tap 108, a drop-line 110, and a portion 112 with a premise 114. The premise 114 is connected to the head-end facility 102 via the combination of the distribution line 106, the feed tap 108, and the drop-line 110. The system 100 further includes a downstream bandwidth 116 and an upstream bandwidth 118, both of which are discussed in more detail below.

Typically the downstream bandwidth 116 and the upstream bandwidth 118 are defined by upper and lower cutoff frequencies. Exemplary frequencies for the downstream bandwidth 116 are more than about 54 Mhz, and in one application can be from about 54 Mhz to about 1002 Mhz. Frequencies for use as the upstream bandwidth 118 are less than about 40 Mhz, and in one application can be from about 5 Mhz to about 40 Mhz.

The terms "downstream bandwidth," and "upstream bandwidth" are used herein to generally describe some of the transmissions that are transmitted, exchanged, and manipulated within systems such as the CATV system 100. As is inherent in systems such as system 102, these terms are used in a manner that describes any number of transmissions. Moreover, each of the transmissions that are described by these terms may exhibit properties that are similar to, or different from, other the properties of other transmissions. These other transmissions can also be classified by the terms "downstream bandwidth," and/or "upstream bandwidth" as used in connection with the various embodiments of the present invention that are disclosed, described, and contemplated herein.

In addition to CATV systems, systems that are configured similar to the system 100 of FIG. 1 include, but are not limited to, other uni-directional, and bi-directional communication systems that communicate with remote premises. Similar systems may transmit the transmissions via transmission lines, e.g., distribution lines 106, and drop lines 110. Transmission lines of the type used as the transmission lines are typically transmission-carrying conductors such as, for example, coaxial cable, shielded cable, multi-core cable, ribbon cable, and twisted-pair cable, among others.

Premises that are connected to the system 100 such as the premise 114 include, for example, homes, apartments (e.g., individual apartments, and/or townhomes), and businesses. These can have any number of devices and or appliances (collectively, "premise devices") that are coupled either directly or indirectly to the drop-line 110. Techniques and equipment that are used to connect each of the individual premise devices to the head-end facility 102 are generally well-known to those familiar with CATV systems, and therefore a detailed discussion is not provided herein unless necessary to clarify any of the concepts of the present invention that are contemplated within the scope and spirit of the present disclosure.

The premise devices can include, but are not limited to, desktop computers, notebook computers, televisions, gaming consoles, set-top-boxes (STB), and set-top-units (STU), among many others. These are generally configured to communicate with the head-end facility 102, via the downstream bandwidth 116 and the upstream bandwidth 118. For example, the premise devices typically receive the downstream bandwidth 116 from the head-end facility 102, and can transmit the upstream bandwidth 118 to the head-end facility 102.

To take advantage of the services that are offered by the CATV system, the upstream bandwidth will include inputs from the premise devices. These inputs may include data that is encoded so that it can be transmitted to the CATV system. It is also likely, however, that the upstream bandwidth will include noise that can interfere, upset, or otherwise negatively impact the exchange of data between the premise devices and the CATV system.

Noise often originates inside of the premise. As illustrated below, it is often introduced at one of the many input ports that are provided as part of the interior wiring that is found inside the premise. For example, some household appliances, and RF equipment generate noise that finds its way into the upstream bandwidth because the noise is inadvertently picked up by the input ports that are not connected to one of the premise devices. Vacuum cleaners, blenders, and household transformers all generate noise that can have deleterious affects on the exchange of information between the premise devices and the CATV system via the upstream bandwidth Likewise, wireless telephones, cellular phones, and baby monitors are specifically designed to generate RF that, while necessary for the functionality of the RF equipment, can interrupt communication between the premise devices and the head-end of the CATV system.

One way to eliminate the noise is to remove the offending devices from the premise. This solution is, of course, simply not feasible and overly restrictive. But it is likewise unacceptable to permit what is by all accounts an inherent flaw that leaves the upstream bandwidth susceptible to this noise. That is, while the downstream bandwidth is generally free of noise because it is monitored and serviced by skilled network engineers employed by the CATV system, the content of the upstream bandwidth is essentially unmonitored because it is left to the premise owner's knowledge, skill, and experience with the equipment that is found at the premise.

Accordingly, there is a need for a device that can maintain the integrity of the upstream bandwidth at the premise, while operating in a manner that requires limited, if any, attention from the premise owner. Such a device is necessary to alleviate the problems that noise can cause such as, for example, the problems related at least to the efficiency and the effectiveness of the data exchange between the premise devices and the CATV system via the upstream bandwidth.

SUMMARY OF THE INVENTION

Embodiments of the present invention are configured to discriminate between noise and non-noise transmissions (e.g., inputs from the premise devices), both of which can be found in the upstream bandwidth. This configuration shifts from the premise owner the responsibility to monitor, maintain, or otherwise become involved with the integrity of the upstream bandwidth because the terminate or permit devices is configured to automatedly discriminate between data, and noise in the upstream bandwidth. It also can substantially improve the communication between the head-end facility and the premise, as well between the head-end facility and other premises because it reduces noise that can contaminate the upstream bandwidth in the local network, as well as other portions of the CATV system.

In this connection, and as discussed in more detail below, an embodiment of the present invention is provided as a terminate or permit device for use in a system comprising a premise generating an upstream bandwidth. The terminate or permit device comprises a first switch that has a position responsive to a control, the position comprises a first position for conducting the upstream bandwidth from the premise, and a second position for terminating the upstream bandwidth. The device also comprises a detection circuit coupled to the transmission line, the detection circuit for generating an input from the upstream bandwidth. The device further comprises a discrimination circuit responsive to the input. In one example, the discrimination circuit comprises a first circuit generating a plurality of long pulses comprising a first long pulse with a first leading edge, and a second long pulse with a second leading edge, and a second circuit responsive to the first leading edge and the second leading edge, the second circuit generating the control. Embodiments of the device can operate wherein the control corresponds to an interval between the first leading edge and second leading edge, and wherein the interval for the first position is less than the interval for the second position.

In another embodiment, there is described a signal conditioning device conditioning an upstream bandwidth from a premise. The signal conditioning device comprises a transmission line with a first switch that has a position responsive to a control, the position comprises a first position for conducting the upstream bandwidth from the premise, and a second position for terminating the upstream bandwidth. The signal conditioning device also comprises a detection circuit coupled to the transmission line, the detection circuit for generating an input from the upstream bandwidth. The detection circuit comprises a directional coupler receiving the upstream bandwidth, a log detector coupled to the directional coupler, and an amplifier coupled to the log detector. In one example, the signal conditioning device further comprises a discrimination circuit coupled to the amplifier so as to receive the input. The discrimination circuit can have a pulse adjuster circuit with a multi-vibrator for generating a plurality of long pulses, the long pulses comprising a first long pulse with a first leading edge, and a second long pulse with a second leading edge. The discrimination circuit can also have a counting circuit comprising a counter responsive to the first leading edge and the second leading edge, the counter counting a number of the long pulses. Embodiments of the signal conditioning device can operate in a manner wherein the number of the long pulses for the first position is greater than the number of the long pulses for the second position.

In still another embodiment, a method is provided for terminating or permitting an upstream bandwidth generated by a premise. The method comprises the steps of generating an input, converting the input to a plurality of long pulses, where the long pulses comprises a first long pulse having a first leading edge, and a second long pulse having a second leading edge. The method also comprises the step of assigning a control based on an interval between the first leading edge and the second leading edge. The method further comprises the step of switching a first switch to a position in response to the control, the position comprising a first position for conducting the upstream bandwidth from the premise, and a second position for terminating the upstream bandwidth. Embodiments of the method can operate wherein the interval for the first position is less than the interval for the second position.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the nature and objects of the invention, references can be made to the following detailed description, read in connection with the drawings in which.

DETAILED DESCRIPTION OF THE INVENTION

Figure 1:
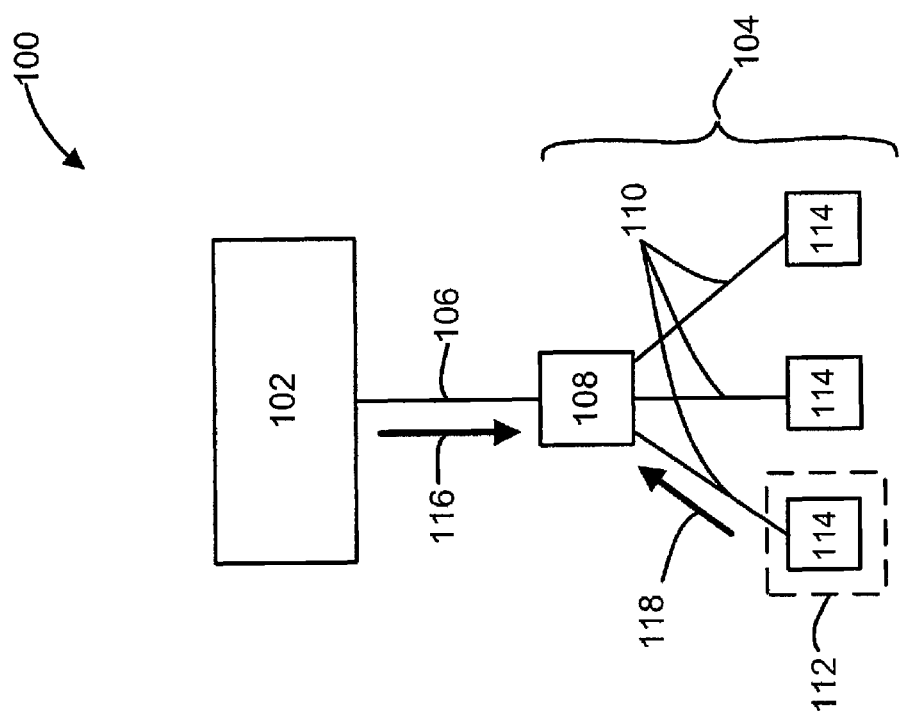
FIG. 1 is a schematic diagram of a cable television ("CATV") system.

With reference to the drawings in general, and FIGS. 2-7 in particular, there is provided apparatus, systems, and methods for processing the upstream bandwidth in a CATV system. Such embodiments are useful to identify when a premise device, e.g., a modem, is connected to an input port in a premise, e.g., a home. The premise devices are typically devices that are configured to transmit data in the form of non-noise transmissions to the head-end facility of the CATV system via the upstream bandwidth.

The upstream bandwidth, however, may also include noise, which can result from conditions in the premise, such as when there is no premise device connected to the input port. For example, input ports that are without the premise device, either temporarily or permanently, are referred to herein as "an open terminal," "an open port," and/or "an open condition." Because they are not being utilized, the open terminals may be susceptible to noise such as, but not limited to, radio wave noise (e.g., shortwave broadcasts), and electromagnetic wave noise that is generated from various household devices, e.g., vacuum cleaners, electric motors, household transformers, welders, among many others. Implementation of the concepts of the present invention that are contemplated herein and discussed below, however, can alleviate many of the issues related to the noise because such concepts discriminate between the non-noise transmissions and the noise in the upstream bandwidth.

It is recognized that the non-noise transmissions and the noise have different characteristics. For example, the non-noise transmissions often exhibit characteristics that are consistent as measured over a period of time. The same characteristics of noise, on the other hand, typically vary randomly as compared to the characteristics of the non-noise transmission. As discussed in more detail below, embodiments of a terminate or permit device that are constructed in accordance with the concepts of the present invention can discriminate between the noise and the non-noise transmissions in the upstream bandwidth. This is beneficial because such devices can be used to identify when the premise device(s) is connected to the input port(s) of the premise, and subsequently permit the upstream bandwidth to enter the CATV system.

Terminate or permit devices include, for example, embodiments of the present invention that are configured to compare portions of the upstream bandwidth to a pre-determined threshold value so as to detect the presence of the premise device. When the non-noise transmissions are detected, these embodiments permit the upstream bandwidth to pass to the CATV system. On the other hand, when non-noise transmissions are not detected, these embodiments terminate the upstream bandwidth so that it does not pass to the CATV system.

Such embodiments typically include one or more groups of electrical circuits that are each configured to operate, separately or in conjunction with other electrical circuits, to terminate and/or permit the upstream bandwidth. The electrical circuits that are used to implement the concepts of the present invention are constructed in a manner that interconnect a variety of electrical elements such as, but not limited to, resistors, capacitors, transistors, transmission lines, and switches. They may further communicate with other circuits (and/or devices), which execute high-level logic functions, algorithms, as well as process firmware, and software instructions. Exemplary circuits of this type include, but are not limited to, field programmable gate arrays ("FPGAs"), and application specific integrated circuits ("ASICs"). While all of these elements, circuits, and devices function individually in a manner that is generally understood by those artisans that have ordinary skill in the CATV arts, it is their combination and integration into functional electrical groups and circuits that generally provide for the concepts of the present invention that are disclosed and described herein.

Accordingly, these electrical circuits may be implemented in a manner that can physically manifest theoretical analysis and logical operations, which are necessary to characterize the pulses and equate the appropriate control therewith. These electrical circuits can replicate in physical form an algorithm, a comparative analysis, and/or a decisional logic tree, each of which operates to assign the control, and/or a value to the control that correctly reflects one or more of the nature, content, and origin of the respective pulses. For example, the electrical circuit may be configured so as to provide a physical indication that the upstream bandwidth does not include non-noise transmissions.

Still other electrical circuits that embody the concepts of the present invention can operate selectively in any number of operating modes. The operating modes may implement specific functionality of the electrical circuit such as, for example, functionality that is similar to a logic gate that performs a logical operation to produce a logic output. On the other hand the operating modes may physically change the operation of the electrical circuit such as to change the direction, path, or location of the upstream bandwidth. The operating modes may result from the operation of the electrical circuits, as well as the combined operation of the electrical circuits, and other devices, which are combined to form one or more embodiments of the present invention.

In addition to the electrical circuits that are described above, as well as the other embodiments that are provided in FIGS. 2-7 and described in detail below, it is likewise practical that the concepts of the present invention are implemented as part of, or in combination with, other signal processing devices that are used to connect the premise with the head-end facility 102 (FIG. 1) of the CATV system 100 (FIG. 1). This may include devices that condition the upstream bandwidth. This may also include devices that provide electrical protection (e.g., surge protectors), signal attenuation, and signal amplification of the upstream bandwidth. This functionality may be incorporated into the devices provided herein, and also in separate devices that are coupled to, or that otherwise interface with the devices that are made in accordance with the present invention.

In view of the foregoing, it is seen that FIGS. 2-5 illustrate examples of a terminate or permit device 200, 300, 400, 500 that can be generally implemented in the CATV system 100 (FIG. 1). For example, and with particular reference to FIG. 2, there is illustrated an example of a terminate or permit device 200 that is made in accordance with concepts of the present invention. Here, it is seen that the terminate or permit device 200 includes an internal circuitry 202 that has a head-end side 204 and a premise side 206. The premise side 206 is coupled to a feed tap 208 via a drop line 210. The apparatus 200 is positioned in a portion 212 of a system, in a configuration similar to the portion 112 of the system 100 of FIG. 1), and more particularly the premise side 206 is coupled to a premise 214.

In the present example, the premise 214 receives a downstream bandwidth 216, and generates an upstream bandwidth 218, as discussed in more detail below. The premise 214 includes a head-end access point 220, and an internal wiring system 222 with a plurality of input ports 224, and a plurality of lines 225, which connect the head-end access point 220 with each of the input ports 224. The premise 214 may also have a number of signal operative devices 226 that includes a noise generator 228, which generates a noise 230, and several premise devices 232 that generate a non-noise transmission 234.

The premise 214 further includes connective cables 236 that connect the premise devices 232 to, e.g., the input ports 224. Here, it is seen that the premise 214 includes a pair of connected ports 238 and an open port 240. The connected ports 238 are coupled to the premise devices 232, via the connective cables 236. The open port 240 is not connected to any of the premise devices 232. It is, for purposes of the discussion of the present example, an "open port" as this term is described above and used herein.

The noise 230 and the non-noise transmission 234 are carried by one or more of the lines 225 towards the head-end access point 220, where they can exit the premise 214 at the head-end access point 220 as the upstream bandwidth 218. Typically the non-noise transmission 234 originates from the connected ports 238. Exemplary transmissions that the non-noise transmission 234 can be include, but are not limited to, transmissions from modems, set-top-boxes, televisions, computers, and any combination thereof. On the other hand, the open port 240 is generally susceptible to random noise that is generated within the premise 214. This includes, for example, the noise 230 that originates from the noise generator 228.

Figure 2:
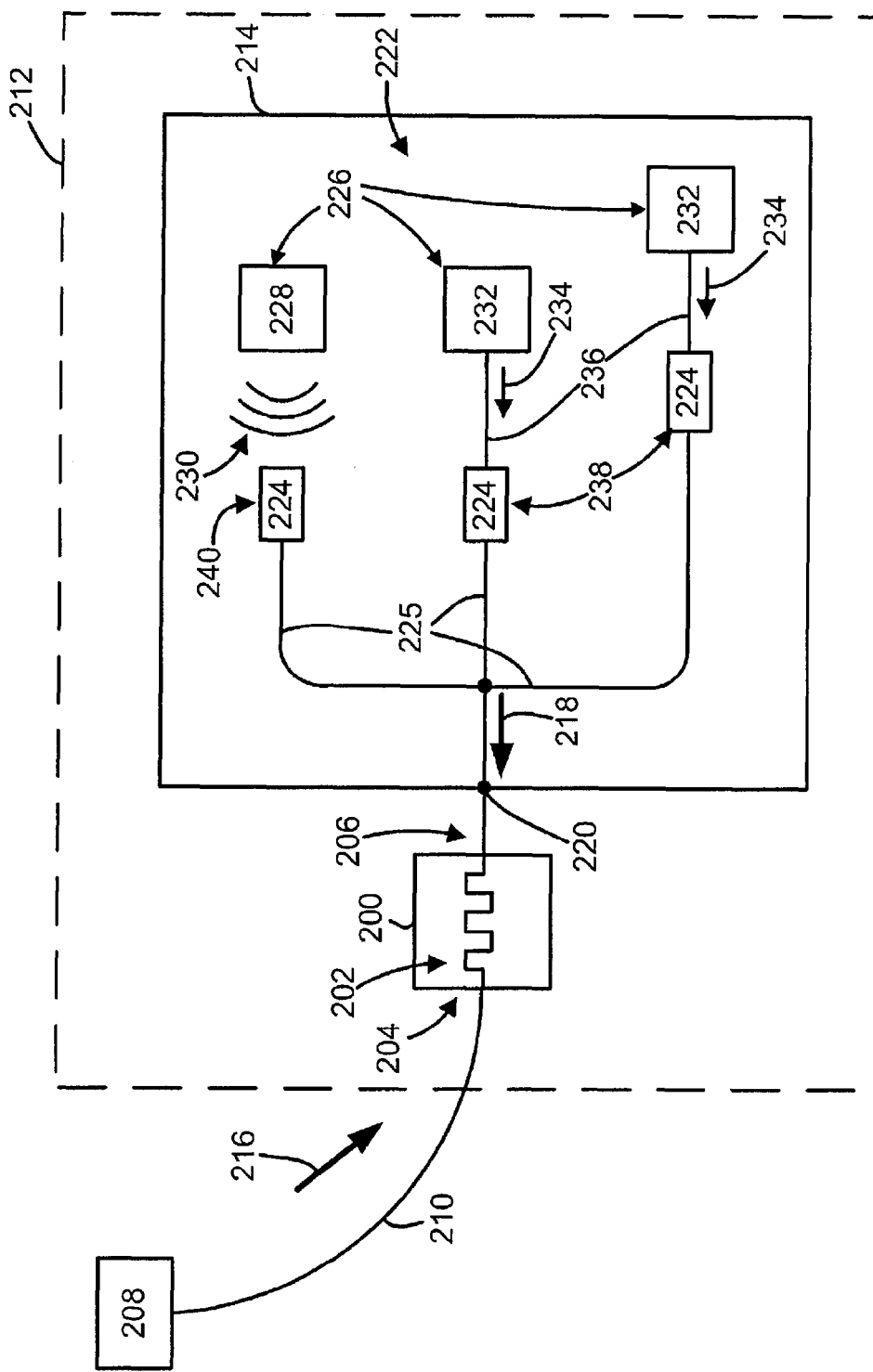
FIG. 2 is a high-level schematic diagram of a portion of a CATV system, such as the CATV system of FIG. 1, that includes an embodiment of a terminate or permit device that is made in accordance with concepts of the present invention.
Figure 3:
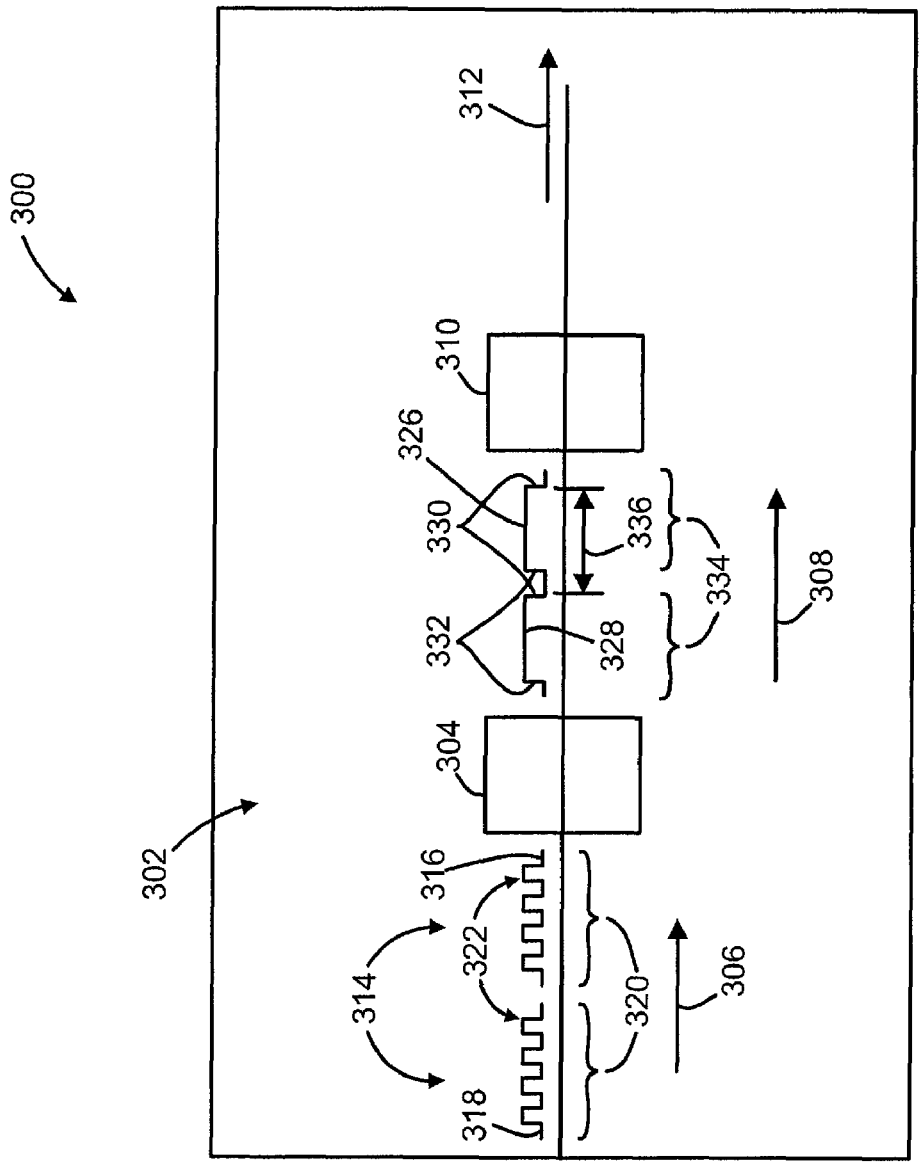
FIG. 3 is a schematic diagram of another embodiment of a terminate or permit device that is made in accordance with the concepts of the present invention.

As is illustrated in FIG. 2, the terminate or permit device 200 is attached to the outside of the premise 214 such as, for example, to the outside of a home, apartment, office building, and the like. In other implementations, however, the terminate or permit device 200 is configured so that it is positioned inside of the premise 214. This includes positions inside of the premise 214 where the terminate or permit device 200 can receive the upstream bandwidth 218 before it is transmitted to, e.g., the head-end facility 102 (FIG. 1).

The terms "head-end side" and "premise side" are used to refer to opposite ends of an element or object, e.g., the terminate or permit device 200 and/or the internal circuitry 202, and do not limit the scope and extent of the present disclosure. Rather, and as discussed in connection with the embodiments of the terminate or permit devices that are contemplated by the present disclosure, parts of the terminate or permit devices are configured so that they receive the input signals before other parts of the terminate or permit device. While generally being defined as the relative location between these parts, it will in some embodiments include one part of the terminate or permit device 200, e.g., the premise side 206, which receives the upstream bandwidth 214 (including the noise 230 and the non-noise transmission 234) before another part of the terminate or permit device 200, e.g., the head-end side 204.

More detailed embodiments of terminate or permit devices can be had with reference to FIGS. 4-7 below. Before continuing with the discussion of those embodiments, however, a general discussion of some features of the present invention is provided with reference to FIG. 3. Here, it is seen that an example of a terminate or permit device 300 is configured to detect the non-noise transmission by separating the non-noise transmission from the noise in the upstream bandwidth. In the present example, the terminate or permit device 300 comprises an internal circuitry 302 with a first circuit 304 that converts an input 306 to an output 308, and a second circuit 310 that generates a control 312 from the output 308.

The input 304 can comprise pulse trains 314, which can comprise a first pulse train 316 and a second pulse train 318. Each of the first pulse train 316 and the second pulse train 318 can have a plurality of pulses 320 that include a first pulse 322. The output 308 can comprise long pulses 324, which can comprise a first long pulse 326 and a second long pulse 328 that correspond, respectively, to the first pulse train 316 and the second pulse train 318. Each of the long pulses 324 can have a lead edge 330, a trailing edge 332, and a pulse length 334 that separates the lead edge 330 from the trailing edge 332. The lead edge 330 of consecutive long pulses 324, e.g., the first long pulse 326 and the second long pulse 328, can be separated by an interval 336.

In one embodiment of the device 300, the first circuit 304 can generate the first long pulse 326, and the second long pulse 328 in response to the first pulse 322 of each pulse train 314. The first circuit 304 can disregard the remaining pulses 320 in the pulse train 314. The pulse length 334 for each of the long pulses 324 can vary such as in accordance with the number of pulses 320 in the pulse train 314, and the anticipated amount of noise generated in the premise, e.g., the premise 214. In one example, the pulse length 334 is the same for each of the long pulses 324.

The second circuit 308 can generate the control 312 in response to the interval 336. The second circuit 308 can compare the interval 336 to a pre-determined threshold value. In one example, the second circuit 308 can register the lead edge 330 of the first long pulses 326, and the lead edge of the second long pulse 328. The pre-determined threshold value can be the time within which the second circuit 308 expects to receive the lead edge 330 of the second long pulse 328 after it receive the lead edge 330 of the first long pulse 326. Differences between the interval 336 and the pre-determined threshold value can be used to separate the non-noise transmission from the noise in the upstream bandwidth.

Exemplary embodiments and examples that can be used to implement this operation of the terminate or permit device are provided in FIGS. 4-7, and discussed in more detail below. For example, and with reference to the detailed schematic of FIG. 4, it is seen that another embodiment of a terminate or permit device 400 is illustrated. In this example, the terminate or permit device 400 includes an internal circuitry 402 with a head-end side 404 and a premise side 406. The internal circuitry 402 also includes a pair of bandwidth paths 408, which preferably has a forward path 410 and a return path 412. The return path 412 includes a processing circuitry 414 that comprises electrical elements (not shown), which are connected and arranged so as to process the upstream bandwidth, e.g., the upstream bandwidth 216 (FIG. 2), in a manner that discriminates between the noise and the non-noise transmission. By way of non-limiting example, and as is pertinent to the example of FIG. 4, the terminate or permit device 400 includes a signal processing unit ("SPU") 416, and a switch/termination unit ("STU") 418. It also includes a control path 420 that electrically couples the SPU 416 and the STU 418, and in one construction of the apparatus 400 the control path 420 transmits a control 422 from the SPU 416 to the STU 418.

The forward path 410 typically receives the downstream bandwidth, e.g., the downstream bandwidth 216 (FIG. 2), at the head-end side 404. It is configured to pass the downstream bandwidth to the premise side 406. The return path 412 receives the upstream bandwidth at the premise side 406. It is configured to pass the upstream bandwidth to the head-end side 404. And as discussed in more detail below, the return path 412 is also configured to terminate the upstream bandwidth in the absence of the transmitters.

To further exemplify and describe this concept in connection with the embodiment of the terminate or permit device 400 of FIG. 4, an exemplary operation of the processing circuitry 314 is provided immediately below. Notably this discussion is meant to supplement the description of the various operative features of the electrical circuits, electrical elements, and other devices that are described herein. There is realized in the operation of devices such as the apparatus 300 certain operative features of the electrical circuits that can be used implement some, if not all, of the concepts of the present invention.

The electrical elements of the SPU 416 can be operatively configured to generate the control 422 from the upstream bandwidth. In one embodiment of the apparatus 400, the control 422 has certain characteristics (e.g., values, properties, among others) that depend, at least in part, on the content of the upstream bandwidth. These characteristics may include, for example, a first set of characteristics that correspond to the presence of the premise device, a second set of characteristics that correspond to the absence of the premise device, a third set of characteristics that correspond to the non-noise transmissions in the upstream bandwidth, and a fourth set of characteristics that correspond to the noise in the upstream bandwidth.

The STU 418 can be operatively configured so that it is responsive to the characteristics of the control 422. In one embodiment of the apparatus 400, upon reception of the control 422 with characteristics that indicate the non-noise transmissions are present, the STU 418 may respond by passing (or allowing to pass) the upstream bandwidth to the head-end side 404. In another embodiment of the apparatus 400, the STU 418 can respond to the control 422 when the control 422 has characteristics that indicate the absence of the non-noise transmissions by preventing the upstream bandwidth from reaching the head-end side 404. In yet another embodiment of the apparatus 400, the STU 418 has a default state that terminates the upstream bandwidth, and a responsive state activated by the control 422 that allows the upstream bandwidth to pass to the head-end side 404. Details of an exemplary construction of both of the SPU 316 and the STU 318 are provided in connection with the FIGS. 5 and 6 that are described in more detail below.

Figure 4:
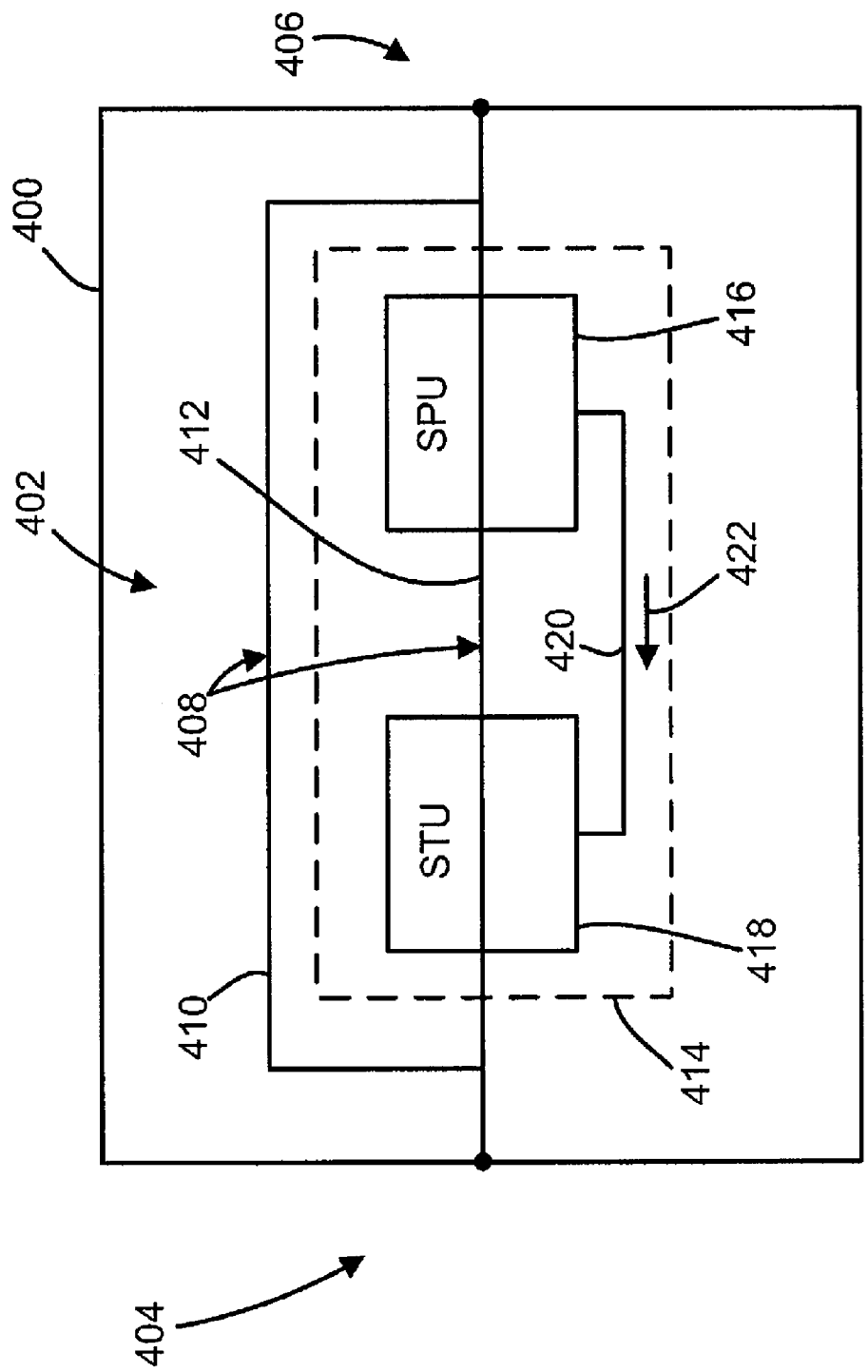
FIG. 4 is schematic diagram of yet another embodiment of a terminate or permit device that is compatible with a CATV system, such as the CATV system of FIG. 1.
Figure 5:
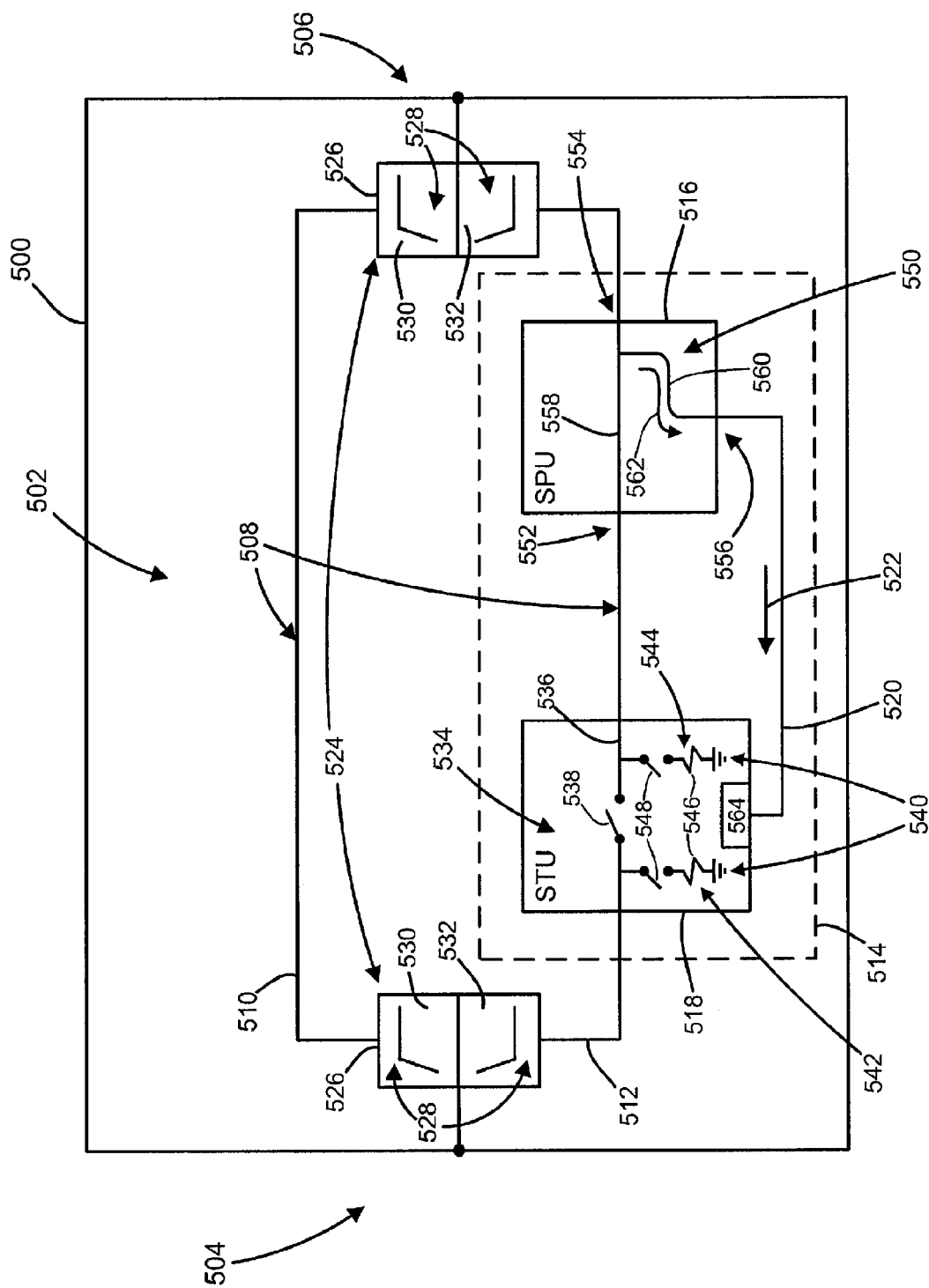
FIG. 5 is a schematic diagram of still another embodiment of a terminate or permit device that is compatible with a CATV system, such as the CATV system of FIG. 1.

For example, and with reference first to FIG. 5, another embodiment of a terminate or permit device 500 is illustrated, where the numerals that are used to identify the components are the same as those found in the apparatus 400 of FIG. 4, except that the numerals are increased 100 (e.g., 400 is now 500). Without further recitation of such like components that are described above, it is shown that the terminate or permit device 500 includes a pair of diplexer sets 524 that are coupled to a forward path 510, and to a return path 512. The diplexer sets 524 include at least one filter device 526 that is configured to pass the downstream bandwidth, e.g., the downstream bandwidth 216 (FIG. 2) to the forward path 510, and the upstream bandwidth, e.g., the upstream bandwidth 218 (FIG. 2), to the return path 512. In one example, the terminate or permit device 526 has filter circuits 528 that include a high-pass filter 530 and a low-pass filter 532 that restrict, respectively, the downstream bandwidth and the upstream bandwidth. Each of the high-pass filter 530 and the low-pass filter 532 have electrical elements that are known in the art, and are constructed using techniques recognized by artisans with skill in the electrical arts, so as to not require further discussion of them herein.

It is also shown in the example of the terminate or permit device 500 of FIG. 5 has a STU 518 that includes a switching circuit 534. The switching circuit 534 includes a pass path 536 with a pass switch 538. The switching circuit 534 also includes one or more terminate paths 540. More particularly, in the present example the terminate paths 540 include a head-end side terminate path 542 and a premise side terminate path 544. These are coupled to the pass path 536 on, respectively, the head-end side 504 and the premise side 506 of the pass switch 538. Both of the terminate paths 540 include a resistor 546 (e.g., a 75 Ohm resistor) and a terminate switch 548.

It is also seen in this example that terminate or permit device 500 of FIG. 5 has a SPU 516 that includes a signal determination circuitry 550 that has an SPU head-end side 552, a SPU premise side 554, and a control side 556. The signal determination circuitry 550 further includes an upstream bandwidth path 558, which connects the SPU head-end side 552 and the SPU premise side 554. The signal determination circuitry 550 further includes a signal processing path 560, which couples the control side 556 to the upstream bandwidth path 558.

In one implementation of the apparatus 500, the SPU 516 receives the upstream bandwidth at the SPU premise side 554. The upstream bandwidth passes from SPU premise side 554 to the SPU head-end side 552 on the upstream bandwidth return path 556. The signal determination circuit 550 couples a portion 562 of the upstream bandwidth to the signal processing path 560. It also processes the coupled portion 562 so as to generate the control 522, and more particularly, to assign the characteristics of the control 522.

The STU 518 can also include a control circuit 564, which is positioned as an integral part of the STU 518, or separately located in one or more other electrical circuits. It is generally configured to operate the switching circuit 534. For example, the control circuit 564 can prevent the upstream bandwidth from passing to the provider side 504, and/or can terminate the upstream bandwidth.

Although it is not illustrated as such, the control circuit 564 is typically coupled to portions of the switching circuit 534 so as that it can activate the pass switch 536, and the terminate switches 548. This may cause them to open and close. For example, the switches can be activated individually, such as if the pass switch 536 and the terminate switches 548 are activated consecutively. However, in other embodiments of the apparatus 500 it may be preferable that the control circuit 564 activates each of the pass switch 542 and terminate switches 552 simultaneously, e.g., at substantially the same moment in time.

The combination and activation of the switches of the switching circuit 534 may also be defined as one or more operating modes. Each of these operating modes may define a particular configuration of the switching circuit 534. This may include, for example, various configurations of the state of the switches, e.g., the pass switch 536, and the terminate switches 548. In one operating mode, the pass switch 536 may be open, and both of the terminate switches 548 may be closed. In another operating mode, the pass switch 536 may be closed, and both of the terminate switches 548 may be open. Still other operating modes may have other combinations for the state of the switches that depend, e.g., on the presence, and/or the absence of the transmitters in the premise.

Figure 6:
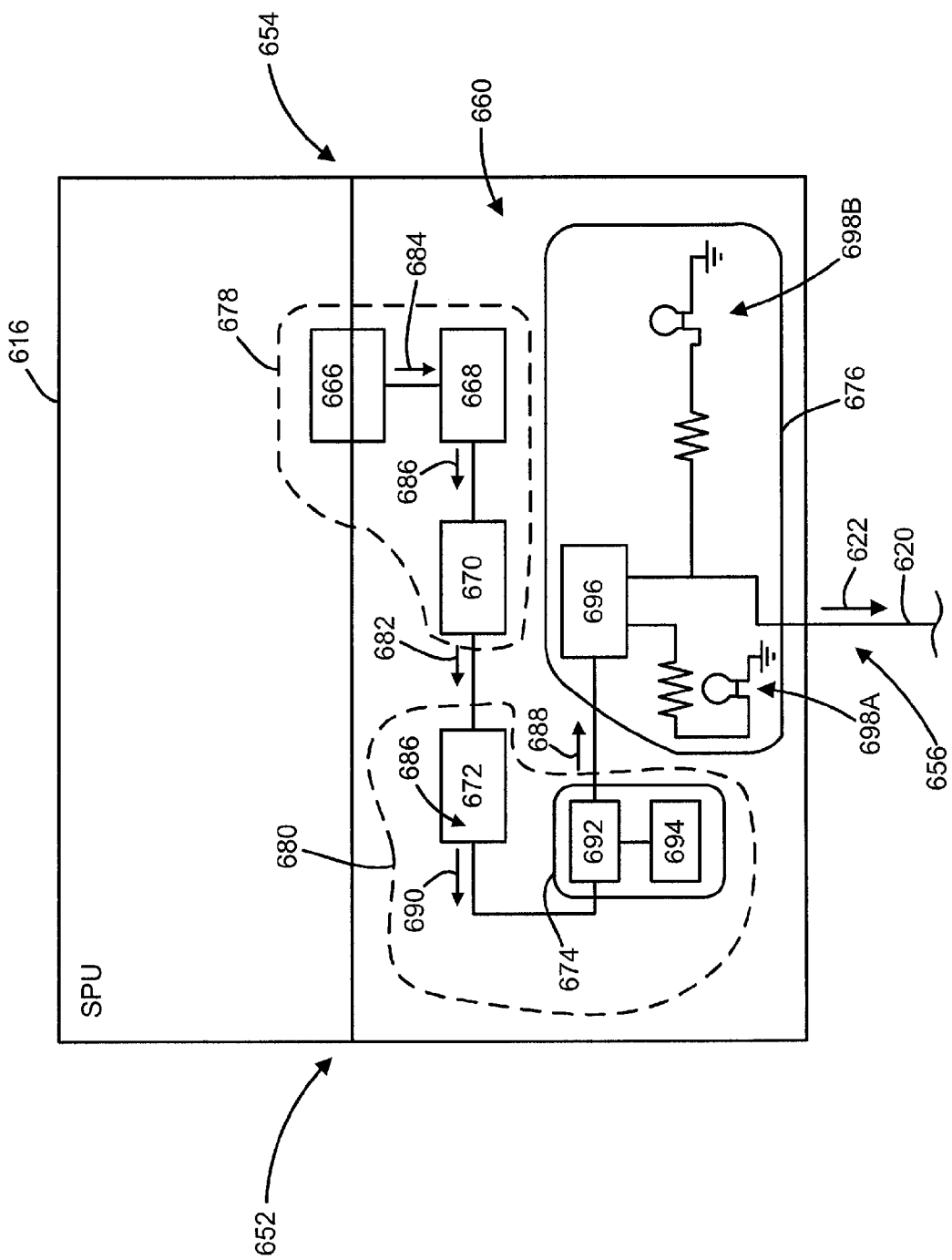
FIG. 6 is a schematic diagram of one example of a signal processing unit ("SPU") that can be used in embodiments of terminate or permit devices, such as the terminate or permit devices discussed in connection with FIGS. 2-4.

As for the above-described control 522, as well as the SPU 516 that generates the control 522, an exemplary configuration of electrical circuits (and electrical elements) for the SPU 516 is illustrated in FIG. 6 and discussed below. Consistent with the discussion of FIG. 5 above, it is also seen here that the numerals that are used to identify like components are the same as those numerals used in FIGS. 4 and 5. It is seen that the SPU 616 in the present example has a signal processing path 660, and in this particular example the signal processing path 660 includes a coupling circuit 666, a detector circuit 668, an amplifier circuit 670, a pulse adjuster circuit 672, a counting circuit 674, and an auxiliary circuit 676. In one embodiment, the coupling circuit 666, the detector circuit 668, and the amplifier circuit 670 form at least part of a detection circuit 678, and the pulse adjuster circuit 672 and the counting circuit 674 form at least a part of a discrimination circuit 680.

When implemented in embodiments of the apparatus, such as the apparatus 200, 300, 400, 500 discussed above, the detection circuit 678 generates an input 682 from the upstream bandwidth, e.g., the upstream bandwidth 218 (FIG. 2). The input 682 is generally in the form of a plurality of pulse trains, each pulse train having pulses with at least one property that is consistent with the characteristics of the upstream bandwidth. These characteristics include, but are not limited to, the amplitude, frequency, period, and wavelength, among others.

In one example, and as it is illustrated in the example of FIG. 6, the coupling circuit 666 provides a coupled portion 684 of the upstream bandwidth to the detector circuit 668, which generates a detected portion 686. The amplifier circuit 670 amplifies the detected portion 686 in a manner generating the input 692. The discrimination circuit 680 generates a preliminary control 688 in response to the input 692, and in one construction of the discrimination circuit 680 the pulse adjuster circuit 672 generates a plurality of pulses 690 such as a long pulse. The long pulses are registered by the counting circuit 666, which also assigns the characteristics of the preliminary control 688.

By way of non-limiting example, the counting circuit 666 includes a counter 692 and a timer 694 that is coupled to the counter 692. The counter 692 is configured to register each of the long pulses from the pulse adjuster circuit 672. In one example, it registers consecutive long pulses that arrive before the expiration of a pre-determined threshold value, e.g., a time value.

The timer 694 can be configured to track, count, or otherwise maintain an indicator of the pre-determined threshold value. It can also be configured to increment the counter 692. In one example, when the counting circuit 666 receives a first long pulse from the phase adjuster circuit 672, the counter 692 is incremented (e.g., from 10 to 9) to recognize that the counting circuit 666 received the first long pulse. The timer 694 will also begin to increment from an initial value (e.g., zero) towards the pre-determined threshold value. In this example, if the counting circuit 666 receives a second long pulse before the timer 694 reaches the pre-determined threshold value, then the counter 692 will increment (e.g., from 9 to 8) so as to recognize that the counting circuit 666 received the second long pulse. On the other hand, if the interval between the consecutive long pulses is longer than the pre-determined threshold value, then the counter 692 will be reset (e.g., from 9 to 10), and remain at this reset value until the counting circuit 666 receives the next long pulse.

Preferably, but not necessarily, the combination of the counter 692 and the timer 694 permits the counting circuit 666 to assign the preliminary control 688 such as by assigning a value (e.g., a high value, and a low value) to the preliminary control 688. In one example, the value may indicate that the counter 692 has reached zero, and the upstream bandwidth is to pass to the head-end side of the apparatus. In another example, the value may indicate that the counter 692 has not reached zero, and the upstream bandwidth is to be terminated before the head-end side of the apparatus.

An example of the coupling circuit 666 includes, but is not limited to, a directional coupler that has its input port and its output port coupled to the return path 612, and its coupled port connected to the signal processing path 660. This permits the upstream bandwidth to pass to the STU, e.g., the STU 518 (FIG. 5), and more particularly from the SPU head-end side 652 to the SPU premise side 654. In this configuration, the directional coupler generates the coupled portion 684 so that the coupled portion 684 has characteristics that are similar to the upstream bandwidth, but without substantially interrupting the transmission of the upstream bandwidth through the SPU 616. Typical directional couplers that are used in the coupling circuit 670 have a coupling ratio greater than about 17 (dB), and in one particular construction the coupling ration is from about 17 (dB) to about 20 (dB).

The detector circuit 668 is comprised of electrical elements that are generally configured to generate the detected portion 686. It may include a log detector, the construction of which will be generally recognized by those artisans having ordinary skill in the electrical arts. In one example, the detected portion 686 comprises a square wave.

Suitable circuits for use as the amplifier circuit 670 generally comprise electrical elements that are arranged in a manner that modifies the detected portion 686. This may include, for example, arranging the electrical elements so that the input 682 is the amplified version of the detected portion 586. In one embodiment of the apparatus, such as apparatus 200, 300, 400, 500 these elements may increase the power, amplitude, or other characteristic of the detected portion 686.

The pulse adjuster circuit 672 is generally configured to generate the pulses 690 from the first pulse in the pulse trains of the input 682. Each of the long may have a pulse length that is meant to cover one or more of the pulses in the pulse train. Exemplary circuitry for use in the pulse adjuster circuit 672 may include transistors, resistors, and capacitors. One construction of the pulse adjuster circuit 672 may include a multi-vibrator with at least one resistor and one capacitor so that the pulse length of the long pulses can be set in accordance with the Equation 1 below, $$t_w = \alpha \times R \times C, \qquad \text{Equation (1)}$$

where $t_w$ is the pulse length, $\alpha$ is a constant (such as, a constant set by a manufacturer of the multi-vibrator), R is a value for the resistor, and C is a value for the capacitor.

The auxiliary circuit 676 is generally responsive to the preliminary control 688. For the purposes of the example of FIG. 6, the auxiliary circuit 680 includes flip-flop circuit 696, a pass disabled indicator 698A, and a pass enabled indicator 698B that is coupled to the control path 620 at the control side 656. The flip-flop circuit 696 is configured to change its output from its low level to its high level in response to the value of preliminary control 688. This can, in turn, activate one or more of the pass disabled indicator 698A and a pass enabled indicator 698B. It is noted that while the auxiliary circuit 676 in the present example includes the flip-flop circuit 696, the operation of which is generally recognized by those having ordinary skill in the art, it is contemplated that it can include any number and type of electrical components to achieve its functional end result.

Discussing another implementation of the SPU 616 as it is applicable to the apparatus 200, 300, 400, 500 discussed above, if the preliminary control 688 indicates that the upstream bandwidth includes non-noise transmissions, then the flip-flop circuit 696 activates the pass enabled indicator 698A, and transmits the control 622 to the control circuit (e.g., the control circuit 564 (FIG. 5)) of the STU (e.g., STU 518 (FIG. 5)). This activates one or more of the switches in the switching circuit. In one particular construction of the apparatus, the control circuit closes the pass switch, and opens the terminate switches. This passes the upstream bandwidth from the premise side to the head-end side of the apparatus.

On the other hand, if the preliminary control 688 indicates that the upstream bandwidth does not include the non-noise transmissions, then the flip-flop circuit 696 activates the pass disabled indicator 698B, and the control circuit (e.g., the control circuit 564 (FIG. 5)) of the STU (e.g., STU 518 (FIG. 5)) maintains the position of the pass switch, and the terminate switches. This terminates the upstream bandwidth, and in one example terminates the upstream bandwidth to ground.

Figure 7:
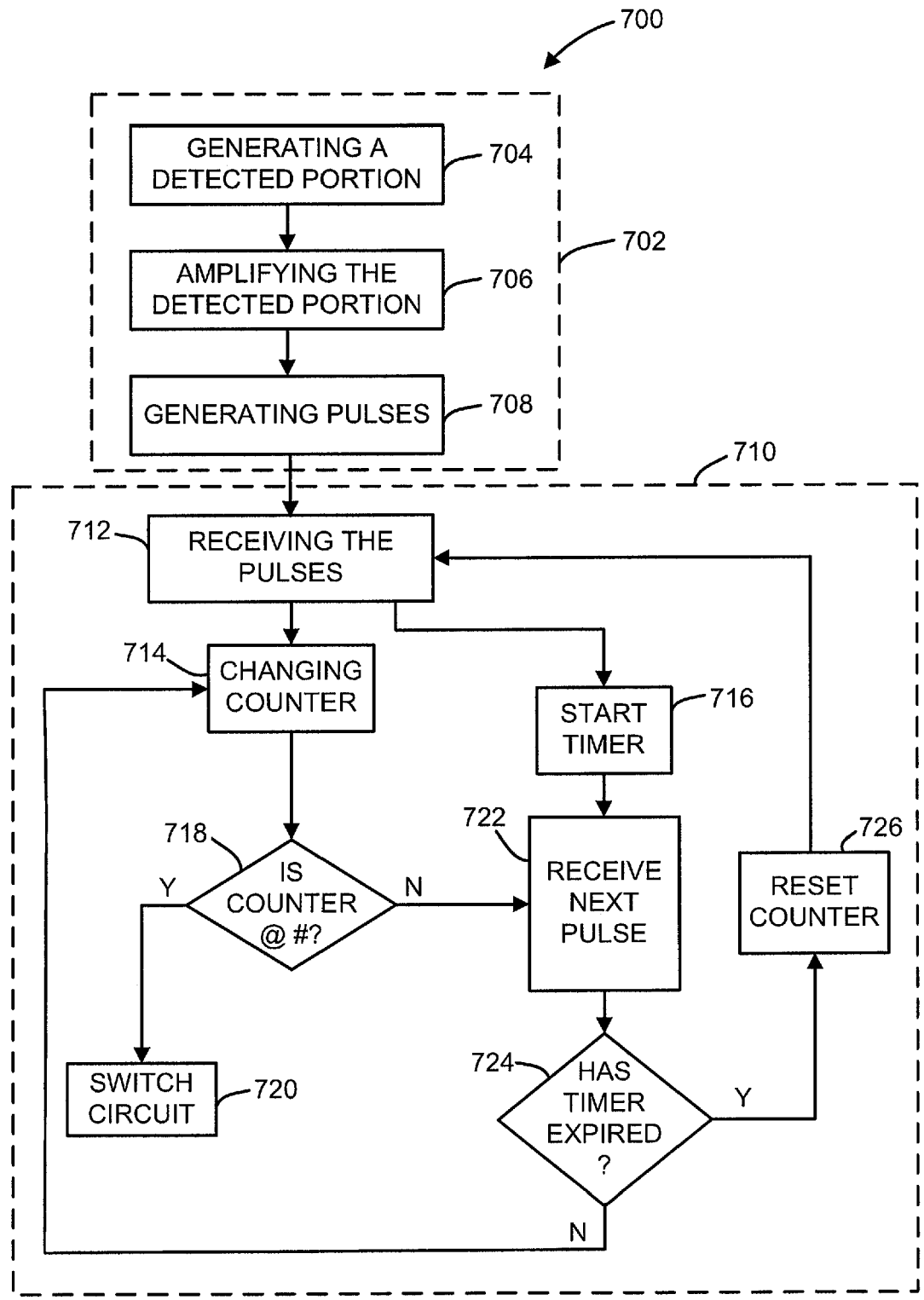
FIG. 7 is a flow diagram of a method for distinguishing between a noise signal and a non-noise signal that can be implemented using, and effectuated as, embodiments of a terminate or permit device such as the terminate or permit devices discussed in connection with FIGS. 2-4.

Referring now to FIG. 7, a flow diagram is illustrated of a method 700 for identifying the presence of a transmitter at a premise. This method 700 can be implemented using embodiments made in accordance with one or more of the terminate or permit devices 200, 300, 400, 500 that are described in connection with FIGS. 2-5 above. As mentioned above, however, it is also recognized that the functionality of the various electrical circuits that are described in connection with the terminate or permit devices 200, 300, 400, 500 of FIGS. 2-5, and the SPU of FIG. 6 above can be embodied in a variety of ways. So it is contemplated that there are other configurations of these circuits that will cause them to operate in the manner discussed above, and provided in connection with the method 700 disclosed herein.

In the present example, the method 700 includes, at step 702, generating a plurality of long pulses from the upstream bandwidth. This may include, at step 704, generating a detected portion. This detected portion can have a waveform that is different from the upstream bandwidth. It may be desirable, for example, that the waveform is that of a square wave, but with characteristics that are adapted to the process of discriminating between noise and non-noise transmissions. This process can be done by, for example, the discriminating circuit discussed above.

In the present example, the method 700 includes, at step 706, amplifying the detected portion, and at step 708, generating the long pulses from the amplified detected portion. The method further includes, at step 710, discriminating between the noise and the non-noise transmissions based on the long pulses. Here, it is seen in the exemplary method of FIG. 7 that the method 700 may include, at step 712, receiving one of the long pulses, at step 714, changing the counter, and at step 716, starting the timer. The method 700 also includes, at step 718, determining if the counter has reached its set number of long pulses. If it has reached the set number, then the method 700 includes, at step 720, configuring the terminate or permit device so as to pass the upstream bandwidth. On the other hand, if the set number has not been reached, then the method 700 includes at step 722, receiving the next long pulse.

The method 700 also includes, at step 724, determining if the next long pulse is received before the timer reaches a pre-determined threshold value. If the next pulse is received before the pre-determine threshold value is reached, then the method 700 returns to step 712-718, and the counter is incremented, the timer is started, the value of the counter is interrogated, and another long pulse is received. If on the other hand the next long pulse is not received before the pre-determined threshold value is reached, then the method 700 includes, at step 726, resetting the counter and the timer. The method 700 also returns to step 712, to await the next long pulse.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A terminate or permit device implemented in a community antenna television (CATV) system comprising a premise generating an upstream bandwidth, said terminate or permit device comprising:
   a first switch having a position responsive to a control, the position comprising a first position for conducting the upstream bandwidth from the premise, and a second position for terminating the upstream bandwidth;
   a detection circuit coupled to a transmission line, the detection circuit for generating an input from the upstream bandwidth; and
   a discrimination circuit responsive to the input, the discrimination circuit comprising:
      a first circuit generating a plurality of long pulses comprising a first long pulse with a first leading edge, and a second long pulse with a second leading edge, and
      a second circuit responsive to the first leading edge and the second leading edge, the second circuit generating the control,
   wherein the control corresponds to an interval between the first leading edge and second leading edge, and wherein the interval for the first position is less than the interval for the second position; and
      wherein the first circuit comprises a multi-vibrator that has at least one resistor with a resistor value, and at least one capacitor with a capacitor value, and wherein each of the resistor value and the capacitor value is selected so that the long pulses have a pulse length that is determined in accordance with, $t_w = \alpha \times R \times C$,
   where $t_w$ is the pulse length, a is a constant, R is the resistor value, and C is the capacitor value.

2. The terminate or permit device according to claim 1, further comprising a counter coupled to the second circuit, the counter counting a first value, and a second value that is different from the first value, wherein the counter changes from the first value to the second value in response to the interval for the first position.

3. The terminate or permit device according to claim 1, further comprising a timer coupled to the second circuit, the timer measuring a pre-determined threshold value, wherein the interval for the first position is less than the pre-determined threshold value.

4. The terminate or permit device according to claim 1, further comprising a directional coupler coupled to the detection circuit.

5. The terminate or permit device according to claim 1, further comprising at least one terminate path comprising a second switch having a terminate position corresponding to the second position of the first switch.

6. The terminate or permit device according to claim 1, further comprising at least one indicator coupled to the discrimination circuit, wherein the indicator indicates one or more of the first position and the second position.

7. A signal conditioning device implemented in a community antenna television (CATV) system for controlling an upstream bandwidth from a premise, said signal conditioning device comprising:
   a transmission line comprising a first switch having a position responsive to a control, the position comprising a first position for conducting the upstream bandwidth from the premise, and a second position for terminating the upstream bandwidth;
   a detection circuit coupled to the transmission line, the detection circuit for generating an input from the upstream bandwidth, wherein the detection circuit comprises a directional coupler receiving the upstream bandwidth, a log detector coupled to the directional coupler, and an amplifier coupled to the log detector;
   a discrimination circuit coupled to the amplifier so as to receive the input, the discrimination circuit comprising:
      a pulse adjuster circuit comprising a multi-vibrator for generating a plurality of long pulses, the long pulses comprising a first long pulse with a first leading edge, and a second long pulse with a second leading edge, and
      a counting circuit comprising a counter responsive to the first leading edge and the second leading edge, the counter counting a number of the long pulses,
   wherein the number of the long pulses for the first position is greater than the number of the long pulses for the second position;
      wherein the multi-vibrator has at least one resistor with a resistor value, and at least one capacitor with a capacitor value, and wherein each of the resistor value and the capacitor value is selected so that the long pulses have a pulse length that is determined in accordance with, $t_w = \alpha \times R \times C$,
   where $t_w$ is the pulse length, a is a constant, R is the resistor value, and C is the capacitor value.

8. The signal conditioning device according to claim 7, wherein the number of the long pulses comprises a first number, and a second number that is different from the first number, and wherein the number of the long pulses changes from the first number to the second number in response to an interval between the first leading edge and the second leading edge.

9. The signal conditioning device according to claim 8, wherein the interval is less than a pre-determined threshold value, and wherein the pre-determined threshold value indicates a time value in which the second leading edge should follow the first leading edge.

10. The signal conditioning device according to claim 7, further comprising at least one diplexer coupled to the transmission line, the diplexer comprising at least one low pass filter for passing the upstream bandwidth to the detection circuit.

11. The signal conditioning device according to claim 7, wherein the transmission line comprises a return path for conducting the upstream bandwidth, and a forward path for conducting a downstream bandwidth to the premise.

12. The signal conditioning device according to claim 7, wherein the directional coupler has a coupling ratio greater than 17 dB.

13. A method of terminating or permitting an upstream bandwidth generated by a premise implemented in a community antenna television (CATV) system, said method comprising:
   generating an input by a detection circuit;
   converting the input to a plurality of long pulses by a first circuit, the long pulses comprising a first long pulse having a first leading edge, and a second long pulse having a second leading edge;
   assigning, by a second circuit, a control based on an interval between the first leading edge and the second leading edge; and
   switching a first switch to a position in response to the control, the position comprising a first position for conducting the upstream bandwidth from the premise, and a second position for terminating the upstream bandwidth,
   wherein the interval for the first position is less than the interval for the second position;
   wherein the first circuit comprises a multi-vibrator that has at least one resistor with a resistor value, and at least one capacitor with a capacitor value, and wherein each of the resistor value and the capacitor value is selected so that the long pulses have a pulse length that is determined in accordance with, $t_w = \alpha \times R \times C$,
   where $t_w$ is the pulse length, a is a constant, R is the resistor value, C is the capacitor value.

14. The method according to claim 13, further comprising coupling a portion of the upstream bandwidth, wherein the input is generated from the coupled portion.

15. The method according to claim 13, further comprising switching a second switch to a terminate position corresponding to the second position of the first switch.

16. The method according to claim 13, further comprising comparing the interval to a pre-determined threshold value, wherein the interval for the first position is less than the pre-determined threshold value.

17. The method according to claim 13, further comprising counting a number of long pulses, the number of long pulse comprising a first number, and a second number that is different from the first number, wherein the interval for the first number is greater than the interval for the second number.

18. The method according to claim 13, further comprising defaulting the first switch in the second position.

* * * * *

UNITED STATES PATENT AND TRADEMARK OFFICE
CERTIFICATE OF CORRECTION

| | |
|---|---|
| PATENT NO. | : 8,141,122 B2 |
| APPLICATION NO. | : 12/567143 |
| DATED | : March 20, 2012 |
| INVENTOR(S) | : Erdogan Alkan |

It is certified that error appears in the above-identified patent and that said Letters Patent is hereby corrected as shown below:

In Column 14, line 58, after "length," delete "a," insert -- $\alpha$ --;

In Column 15, line 50, Claim 7, after "length," delete "a," insert -- $\alpha$ --;

In Column 16, line 41, Claim 13, after "length," delete "a," insert -- $\alpha$ --;

In Column 16, line 54, Claim 17, after "the number of long," delete "pulse," insert -- pulses --.

Signed and Sealed this
First Day of May, 2012

David J. Kappos
*Director of the United States Patent and Trademark Office*